March 17, 1931.  J. F. O'CONNOR  1,796,617
HAND BRAKE
Filed Oct. 14, 1927
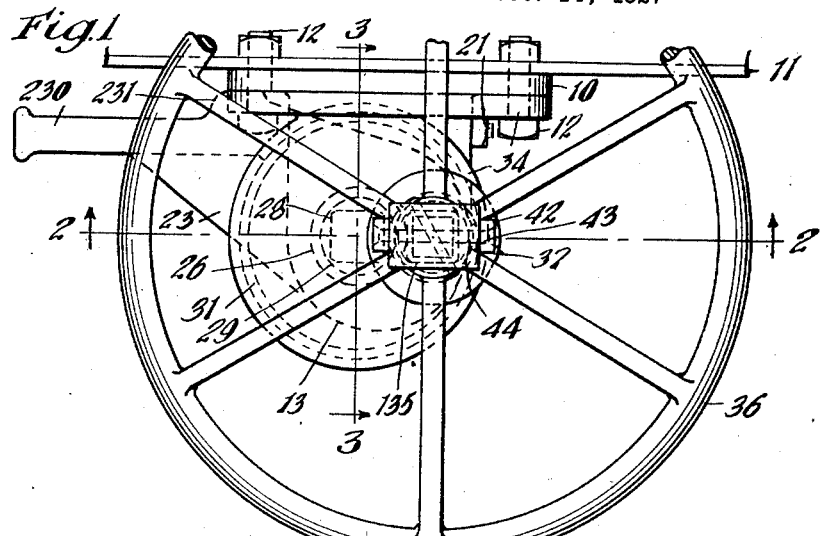
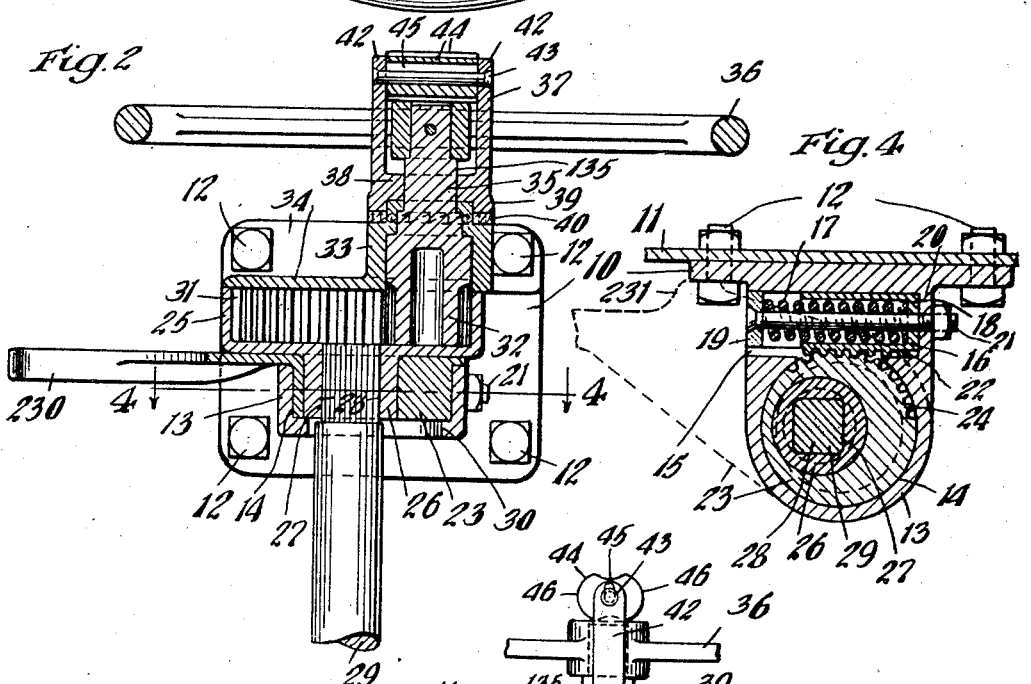
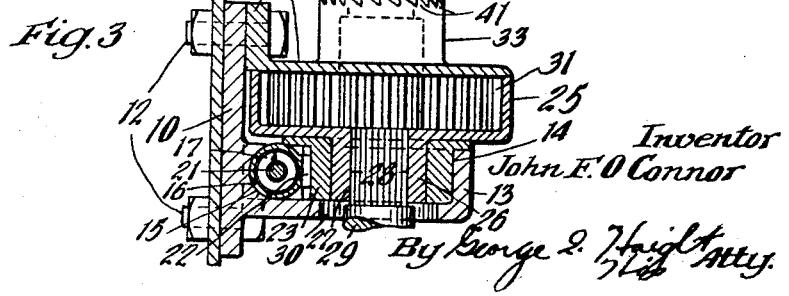
Witness
Wm. Geiger
Inventor
John F. O'Connor
By George L. Haight Atty.

Patented Mar. 17, 1931

1,796,617

UNITED STATES PATENT OFFICE

JOHN F. O'CONNOR, OF CHICAGO, ILLINOIS, ASSIGNOR TO W. H. MINER, INC., OF CHICAGO, ILLINOIS, A CORPORATION OF DELAWARE

HAND BRAKE

Application filed October 14, 1927. Serial No. 226,082.

This invention relates to improvements in hand brakes.

An object of the invention is to provide a hand brake mechanism wherein a ring gear and pinion are connected respectively with the hand wheel and the brake staff to drive the latter, together with means operable to throw the ring gear and pinion out of mesh to permit quick release of the brake mechanism.

Other and further objects of the invention will more clearly appear from the description and claims hereinafter following.

In the drawings forming part of this specification, Figure 1 is a broken top plan view of the mechanism applied to the end wall of the railway car. Figure 2 is a vertical sectional view of the invention corresponding to the line 2—2 of Figure 1, and showing parts of the device in elevation. Figure 3 is a transverse vertical sectional view of the invention corresponding substantially to the line 3—3 of Figure 1 and Figure 4 is a horizontal sectional view corresponding to the line 4—4 of Figure 2.

As shown in the drawings, a bracket 10 is provided, rectangular in shape, and is secured to the body portion 11 of the car by means of bolts 12 extending through the corners of the bracket and the body portion 11. Formed on the bracket is an outwardly projecting supporting portion 13, provided with an annular socket 14, as best shown in Figures 2 and 4, said socket portion communicating at its inner end with a guideway 15 in which is slidably mounted a rack member 16. The rack member 16 is in the form of a hollow cylinder open at one end, slidably disposed in the guideway 15, and disposed within the cylinder is a coil spring 17, one end of which bears upon the end wall 18 of the member 16 while the opposite end bears upon the washer mounted on the bolt 21. Movement of the member 16 in a right-hand direction as viewed in Figure 4 is limited by the wall 20 of the bracket, and extending through the wall 20 of the bracket, the end wall 18 of the member 16, and the washer 19 is a retaining bolt 21, which maintains the parts in proper assembled relation with respect to the bracket.

The annular wall of the member 16 along one side is provided with a rack 22, adapted to cooperate with the release member 23 of the brake.

The release member 23 is annular in form and is rotatably disposed in the annular socket 14 provided by the bracket, and said member is provided with teeth 24 which mesh with the teeth 22 upon the member 16, as best shown in Figure 4. The member 23 is provided with a handle 230 by means of which the member 23 may be rotated, said handle having a portion 231 adapted to bear against the bracket to limit rotation of the member 23 in a clockwise direction under the influence of the spring 17.

Eccentrically mounted with reference to the member 23 is a ring gear 25, the hub 26 of which is rotatably disposed in an eccentric opening of the member 23, said gear being carried by the member 23. The hub 26 of the gear is provided with a square opening indicated at 27 for the reception of the square portion 28 of the upper end of the brake staff proper indicated at 29, the lower end of which is mounted in any suitable manner and connected with the brake rigging. The staff 29 extends through an elongated opening 30 in the bottom of the socket member 14 on the bracket whereby limited lateral movement of the upper end of the staff 29 is permitted when the release mechanism is operated.

The ring gear is provided with internal teeth 31, and at one side of the gear the teeth 31 are adapted to mesh with a driving pinion 32. The driving pinion 32 is rotatably mounted in a boss 33 mounted upon an extension 34 upon the bracket, said extension having a portion overlying the gear 25, and slightly spaced from the upper periphery thereof. The pinion 32 has an upwardly projecting extension 35 to which is secured the hand wheel 36, rotation of the hand wheel serving to drive the pinion 32.

Means are provided for preventing retrograde rotation of the pinion 32. Said means include a pawl member 37 having a transversely disposed web 38 provided with a central square opening which is slidably disposed upon the square portion 135 formed upon the extension 35. The pawl member 37 at its lower end has an annular portion 39 provided with ratchet teeth 40 adapted to engage ratchet teeth 41 formed upon the upper edge of the boss 33. The pawl member 37 includes two spaced upstanding arms 42—42, which project upwardly beyond the top of the hand wheel 36, the ends of said arms being provided with a fixed pin 43 upon which is mounted a cam member 44. The cam member is provided with a vertically disposed slot 45 which normally permits said member to move somewhat with reference to the pin 43 to permit the pawl member 37 to reciprocate vertically while the teeth 40 thereof are passing over the teeth 41 on the boss 33. The cam member 44 when rotated about the pin 43 operates to elevate the pawl member 37 due to the interposition of one of the enlarged portions 46 between the top of the hand wheel 36 and the pin 43, thereby holding the teeth 40 of the pawl clear of the teeth 41 on the boss 33.

In operation, assuming rotation of the hand wheel 36 in a clockwise direction, similar rotation will be imparted to the internal gear 25, which movement is transmitted to the mast 29. During this action, the teeth 40 of the pawl 37 ride over the teeth 41 on the boss 33, but prevent rotation of the pinion 32 in a reverse direction as will be understood. When it is desired to quickly release the brake the handle 230 of the carrier member 23 is grasped and pulled in a counter-clockwise rotation, causing rotation or rather oscillation of the member 23 in the annular socket 14 of the supporting member 13. This action shifts the gear 25 toward the right as viewed in Figure 2, disconnecting the teeth of the gear from teeth of the pinion 32. During this action of the carrier member 23, the teeth 24 thereon move the follower 16 toward the left, as viewed in Figure 4, compressing the spring 17. The handle 230 after the same has been pulled in a clockwise direction is held at the limit of its movement until the brake mast 29 has rotated sufficiently to permit complete unwinding of the brake chain from the drum on the mast, the mast 29 of course being slightly tilted during this operation as permitted by the clearance accorded through provision of the opening 30 in the support 13. When the handle 230 is released, the carrier member 23 is re-positioned through action of the follower 16 thereon, under influence of the spring 17, causing re-engagement of the teeth of the gear 25 with the teeth of the pinion 32.

When desired, the teeth 40 of the pawl 37 may be held clear of the teeth 41 of the boss 33 through manipulation of the cam 44, to permit complete unwinding of the brake chain from the drum on the mast 29, after the gear 25 and pinion have been re-engaged. This is accomplished by rotating the cam 44 so as to dispose one of the enlarged portions 46 between the top of the top surface of the hand wheel hub, and the pin 43, which elevates the pawl member 37 and maintains the teeth thereof clear of the teeth upon the boss 33, so that the pinion 32, gear 25, and mast 29 may rotate in a retrograde rotation a sufficient distance to permit complete unwinding of the brake chain from the drum under the jarring of the train, thereby preventing dragging of the brake shoes on the wheels.

While I have herein shown and described what I consider the preferred manner of carrying out the invention, the same is merely illustrative, and I contemplate all changes and modifications which come within the scope of the claims appended hereto.

I claim:

1. In a hand brake, the combination with a laterally movable rotatable element having a portion adapted to have a brake chain wound thereon; of an internal ring gear connected to said rotatable element; a rotatable driving pinion having teeth disposed in mesh with the teeth of said ring gear; a manually operated member for rotating said pinion; a rotatably mounted carrier member in which said ring gear is eccentrically mounted for oscillation, oscillatory movement of said carrier serving to shift said ring gear out of mesh with said driving pinion to permit quick release of the brake; and manually operating means for oscillating said carrier to shift the ring gear.

2. In a hand brake, the combination with a laterally movable rotatable element having a portion adapted to have a brake chain wound thereon; of an internal ring gear connected to said rotatable element; a rotatable driving pinion having teeth disposed in mesh with the teeth of said ring gear; manually operating means for actuating the pinion; a rotatably mounted carrier member in which said ring gear is eccentrically mounted for oscillation, oscillatory movement of said carrier serving to shift said ring gear out of mesh with said driving pinion to permit quick release of the brake; an operating lever for actuating said carrier; and resilient means normally maintaining said carrier member in position to hold said ring gear and pinion in mesh.

3. In a hand brake, the combination with a rotatable element adapted to tighten a brake chain; a driven element connected to said rotatable element; a driving element cooperating with said driven element to drive the latter; carrier means for one of said elements, said carrier means being rotatably mounted and carrying the associated element in eccentric position, whereby movement of said carrier member disengages said driven and driving elements to effect quick release of the brake, said carrier member being provided with teeth; and a spring actuated follower having teeth meshing with the teeth of said carrier member, for returning said carrier member and maintaining the same in position to hold said driving element and said driven element in operative engagement.

4. In a hand brake, the combination with a rotatable element adapted to tighten a brake chain; a driven element connected to said rotatable element; a driving element co-operating with said driven element to drive the latter; carrier means for one of said elements, said carrier means being rotatably mounted and carrying the associated element in eccentric position, whereby movement of said carrier member disengages said driven and driving elements to effect quick release of the brake, said carrier member being provided with teeth; a spring actuated follower having teeth meshing with the teeth of said carrier member, for returning said carrier member and maintaining the same in position to hold said driving element and said driven element in operative engagement; pawl and ratchet mechanism for preventing retrograde rotation of said driving element; and means for maintaining the pawl member of said mechanism in inoperative position.

5. In a hand brake, the combination with a brake tightening member; of a support; a driven element associated with said brake tightening member and a driving element adapted to co-operate with said driven element, said driving and driven elements being relatively movable with reference to each other to disengage the same; a carrier member oscillatably mounted on said support and eccentrically supporting one of said elements, movement of said carrier member serving to disengage said driving and driven elements; ratchet teeth formed on said support; and a pawl member movable with said driving member and reciprocable with reference thereto, adapted to engage the ratchet teeth on said support to prevent retrograde and rotation of said driving member.

6. In a hand brake, the combination with a brake tightening member; of a support; a driven element associated with said brake tightening member and a driving element adapted to co-operate with said driven element, said driving and driven elements being relatively movable with reference to each other to disengage the same; a carrier member oscillatably mounted on said support and eccentrically supporting one of said elements, movement of said carrier member serving to disengage said driving and driven elements; ratchet teeth formed on said support; a pawl member movable with said driving member and reciprocable with reference thereto, adapted to engage the ratchet teeth on said support to prevent retrograde rotation of said driving member; and means for holding said pawl member in position to clear the teeth on said support.

7. In a hand brake, the combination with a brake tightening element; of a driving member, said driving member being rotatably mounted upon a support and having an extension thereon polygonal in cross section, said support being provided with an annular series of teeth surrounding said extension; and a pawl member having an annular series of teeth engageable with the teeth on said support, said pawl member being non-rotatably and reciprocably mounted upon the extension of said driving element.

8. In a hand brake, the combination with a brake tightening element; of a driving member, said driving member being rotatably mounted upon a support and having an extension thereon polygonal in cross section, said support being provided with an annular series of teeth surrounding said extension; and a pawl member having an annular series of teeth engageable with the teeth on said support, said pawl member being non-rotatably and reciprocably mounted upon the extension of said driving element, and said pawl member being provided with spaced arms; and a cam member carried by said arms and adapted to be supported through said extension to maintain the teeth of said pawl member clear of the teeth on said support.

9. In a hand brake, the combination with a support provided with an annular socket; of a carrier member oscillatably mounted in said socket provided with teeth thereon; of an internal ring gear having a hub rotatably mounted in an eccentric position in said carrier member; a tiltable brake tightening element to which said ring gear is connected; a spring influenced follower carried by said support, said follower having a rack engageable with the teeth on said carrier whereby said carrier is maintained in predetermined position; a driving pinion mounted on said support and having teeth adapted to mesh with the teeth of said ring gear, said pinion being provided with an extension to which a hand wheel is connected, said support being provided with an annular series of ratchet teeth surrounding the extension upon said pinion; a pawl non-rotatably and reciprocably mounted on said extension, said pawl being provided with an annular series of teeth adapted to co-act with the teeth on said support; and means co-operating with said pawl to maintain the teeth thereon clear of the teeth on said support in certain positions of the parts.

In witness that I claim the foregoing I have hereunto subscribed my name this 11th day of October, 1927.

JOHN F. O'CONNOR.